(12) United States Patent
Sung

(10) Patent No.: US 7,126,589 B2
(45) Date of Patent: Oct. 24, 2006

(54) TOUCH CONTROL PANEL

(75) Inventor: Guang-Tau Sung, Taichung Hsien (TW)

(73) Assignee: Au Optronics Corporation, Hsinchu (TW)

( * ) Notice: Subject to any disclaimer, the term of this patent is extended or adjusted under 35 U.S.C. 154(b) by 294 days.

(21) Appl. No.: 10/065,183

(22) Filed: Sep. 24, 2002

(65) Prior Publication Data
US 2003/0222855 A1    Dec. 4, 2003

(30) Foreign Application Priority Data
May 29, 2002   (TW) ................................. 91111434 A

(51) Int. Cl.
G09G 5/00    (2006.01)
(52) U.S. Cl. ...................... 345/173; 345/174; 345/179; 345/178
(58) Field of Classification Search ................... 345/32, 345/84, 70, 104, 151, 173–182; 178/18.01–11, 178/19.01–19.07, 20.01–20.04; 340/365, 340/712, 784, 805; 428/447, 327; 318/280, 318/460; 361/681; 219/121.69; 313/500, 313/506; 349/113, 140, 187; 250/370.09
See application file for complete search history.

(56) References Cited

U.S. PATENT DOCUMENTS

| | | | | |
|---|---|---|---|---|
| 4,695,827 A | * | 9/1987 | Beining et al. | 341/31 |
| 4,766,424 A | * | 8/1988 | Adler et al. | 345/175 |
| 5,206,632 A | * | 4/1993 | Dupont et al. | 345/92 |
| 5,590,930 A | * | 1/1997 | Glockl | 297/313 |
| 5,673,127 A | * | 9/1997 | Takahara et al. | 349/140 |
| 5,784,054 A | * | 7/1998 | Armstrong et al. | 345/177 |
| 6,020,590 A | * | 2/2000 | Aggas et al. | 250/370.09 |
| 6,169,379 B1 | * | 1/2001 | Zhang et al. | 318/280 |
| 6,300,594 B1 | * | 10/2001 | Kinoshita et al. | 219/121.69 |
| 6,369,865 B1 | * | 4/2002 | Hinata | 349/12 |

(Continued)

FOREIGN PATENT DOCUMENTS

JP    56033611 A   *   4/1981

(Continued)

Primary Examiner—Bipin Shalwala
Assistant Examiner—Prabodh Dharia
(74) Attorney, Agent, or Firm—J.C. Patents

(57) ABSTRACT

A touch control panel comprises a transparent substrate, a contact layer, a first transparent electrode formed over the transparent substrate and a second transparent electrode formed over the contact layer facing the first transparent electrode. The space between the first transparent electrode and the second transparent electrode contains a plurality of spacers. The transparent substrate or the contact layer or both have ultra-violet ray shielding capability.

9 Claims, 2 Drawing Sheets

U.S. PATENT DOCUMENTS

| | | | |
|---|---|---|---|
| 6,555,235 B1* | 4/2003 | Aufderheide et al. | 428/447 |
| 6,587,097 B1* | 7/2003 | Aufderheide et al. | 345/173 |
| 6,628,268 B1* | 9/2003 | Harada et al. | 345/173 |
| 6,738,050 B1* | 5/2004 | Comiskey et al. | 345/173 |
| 6,807,823 B1* | 10/2004 | Ohga et al. | 65/30.1 |
| 6,882,388 B1* | 4/2005 | Sugiura et al. | 349/113 |
| 2001/0021110 A1* | 9/2001 | Nakayama et al. | 362/247 |
| 2002/0000979 A1* | 1/2002 | Furuhashi et al. | 345/173 |
| 2002/0037797 A1* | 3/2002 | Ohga et al. | 501/54 |
| 2002/0047108 A1* | 4/2002 | Yukinobu et al. | 252/500 |
| 2002/0140886 A1* | 10/2002 | Sugiura et al. | 349/113 |
| 2002/0167268 A1* | 11/2002 | Aruga et al. | 313/500 |
| 2003/0048597 A1* | 3/2003 | Wang et al. | 361/681 |
| 2003/0096693 A1* | 5/2003 | Ohga et al. | 501/54 |
| 2003/0214695 A1* | 11/2003 | Abramson et al. | 359/265 |
| 2003/0222857 A1* | 12/2003 | Abileah | 345/173 |
| 2004/0001177 A1* | 1/2004 | Byun et al. | 349/187 |
| 2004/0144754 A1* | 7/2004 | Itami et al. | 216/62 |
| 2004/0150331 A1* | 8/2004 | Okubo et al. | 313/506 |
| 2004/0252867 A1* | 12/2004 | Lan et al. | 382/124 |
| 2005/0122463 A1* | 6/2005 | Byun et al. | 349/187 |
| 2005/0134768 A1* | 6/2005 | Sugiura et al. | 349/113 |

FOREIGN PATENT DOCUMENTS

| | | | |
|---|---|---|---|
| JP | 07-201280 | * | 8/1995 |
| JP | 09052964 A | * | 2/1997 |
| JP | 2001322198 A | * | 11/2001 |

* cited by examiner

US 7,126,589 B2

TOUCH CONTROL PANEL

CROSS REFERENCE TO RELATED APPLICATIONS

This application claims the priority benefit of Taiwan application serial no. 91111434, filed May 29, 2002.

BACKGROUND OF INVENTION

1. Field of Invention

The present invention relates to a touch control device. More particularly, the present invention relates to a touch control panel capable of withstanding ultra-violet rays.

2. Description of Related Art

Due to the persistent progress in semiconductor technologies, the level of integration of circuits and their operating speed increases at an ever-increasing rate. The modern world is filled with digital electronic products. However, before the transmission of digital data or signals required by a digital control device, an input mechanism for inputting data is necessary. Digital data is commonly input through a keyboard using a high-level language format. For example, the computer keyboard is able to input text and instructions. Nevertheless, keyboard is not the best data input method under all circumstances.

To ease digital data input and control, another common input method is a touch control panel. In a system incorporating a touch control panel, data and instructions can be fed into a system by touch. In fact, the touch control panel provides a user with a free and convenient method of input. For example, transparent touch control panel may be adhered to certain display region of a flat panel display screen. Rather than inputting data through a keyboard, data is directly fed into a system by touching the display panel. Unlike a keyboard, the touch panel is an input device that receives signals and hence may transmit pictures and textual writings. Because of such conveniences, touch control panel is also used in many electronic devices.

However, a conventional touch control panel has little resistance for the passage of ultra-violet rays. When the touch control panel is used in outdoor activities or in areas having a high ultra-violet index, the ultra-violet rays can easily penetrate into the light-channeling board or backlight panel. In general, the light-channeling board is made of polycarbonate (PC) or polymethyl methacrylate (PMMA). Since PC and PMMA may decompose in the presence energetic light rays, prolonged illumination by ultra-violet light may lead to deterioration such as the fogging of the display screen.

FIG. 1 is a schematic cross-sectional view of a conventional touch control panel 110. As shown in FIG. 1, the touch control panel 110 includes a transparent substrate 100. A transparent electrode 102 is formed over the substrate 100. In general, the transparent electrode 102 is made of an indium-tin-oxide (ITO) compound. An adhesion layer 103 is formed near the edges of the transparent electrode 102. A contact layer 104 is attached to the adhesion layers 103. At present, the contact layer 104 is mostly made from material such as polyester or glass. The contact layer 104 also has a layer of transparent electrode 102 on the side facing the transparent substrate 100. A plurality of spacers 108 is formed in the space between the transparent substrate 100 and the contact layer 104. The spacers prevent direct contact of the transparent electrode 102 attached to the transparent substrate 100 with the transparent electrode 102 attached to the contact layer 104 due to sagging as a result of self-weight. The spacers 108 are formed over the transparent electrode 102 of the transparent substrate 100 by printing, for example. The outer surface of the contact layer 104 may further include a hard coating 106 for protecting the contact layer 104 and increasing its hardness. When the contact layer 104 is touched so that the transparent electrode 102 on the transparent substrate 100 is contacted, the position of the contact point is registered through a difference in resistive value at the point of contact.

The aforementioned touch control panel 110 has no special provision for blocking out ultra-violet light and hence ultra-violet rays will illuminate the devices underneath the panel. When the touch panel 110 and a liquid crystal display panel are used together, ultra-violet rays can still penetrate into the light-channeling panel causing the aging problem.

FIG. 3 is a schematic cross-sectional view of a conventional liquid crystal display panel with a touch panel structure therein. As shown in FIG. 3, a conventional touch control panel 110 is disposed over a display panel 206. In general, the touch control panel 110 is attached to the edges of the display panel 206 through a double-sided tape 208. The display panel 206 is a liquid crystal display panel, for example. Since a conventional touch control panel 110 has no provision for resisting ultra-violet light, ultra-violet light can easily penetrate into the light-channeling panel (not shown) inside the display panel 206. Prolonged illumination to ultra-violet light rays may lead to aging of the light-channeling panel and result in a hazy display panel.

SUMMARY OF INVENTION

Accordingly, one object of the present invention is to provide a touch control panel not only capable of joining with a display panel but also capable of shielding devices inside the display panel against ultra-violet rays.

To achieve these and other advantages and in accordance with the purpose of the invention, as embodied and broadly described herein, the invention provides a touch control panel shielded against ultra-violet rays. The touch control panel includes a transparent substrate and a contact layer. A first transparent electrode is formed over the transparent substrate. A second transparent electrode is formed over the contact layer such that the second transparent electrode faces the first transparent electrode. A plurality of spacers is formed in the space between the first transparent electrode and the second transparent electrode. Either the transparent substrate or the contact layer is capable of shielding out ultra-violet rays. For better protection, both the transparent substrate and the contact layer are capable of shielding out ultra-violet rays. The second transparent electrode on the contact layer and the first transparent electrode on the transparent substrate are attached to each other through an adhesion element.

The contact layer may include a hard coating layer on the other side of the second transparent electrode for protecting the contact layer and strengthening the hardness of the contact layer.

Furthermore, the touch control panel may integrate with a display panel such as an organic light emitting diode panel, a plasma display panel, a liquid display panel and an cathode ray tube display screen.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Figure 1:
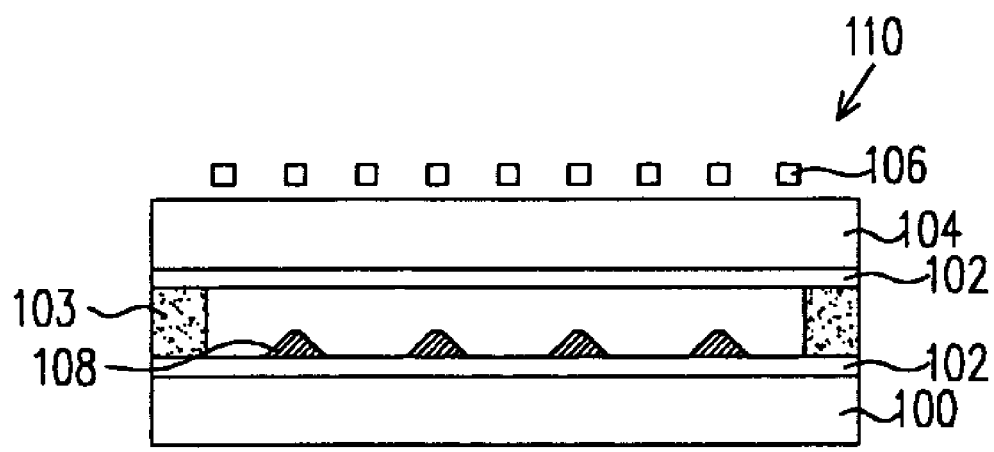
FIG. 1 is a schematic cross-sectional view of a conventional touch control panel.

Reference will now be made in detail to the present preferred embodiments of the invention, examples of which are illustrated in the accompanying drawings. Wherever possible, the same reference numbers are used in the drawings and the description to refer to the same or like parts.

One major aspect of this invention is the deployment of ultra-violet shielding material to form the transparent substrate on the contact layer above a touch control panel. Consequently, the touch control panel fabricated according to this invention is capable of resisting ultra-violet light.

Figure 2:
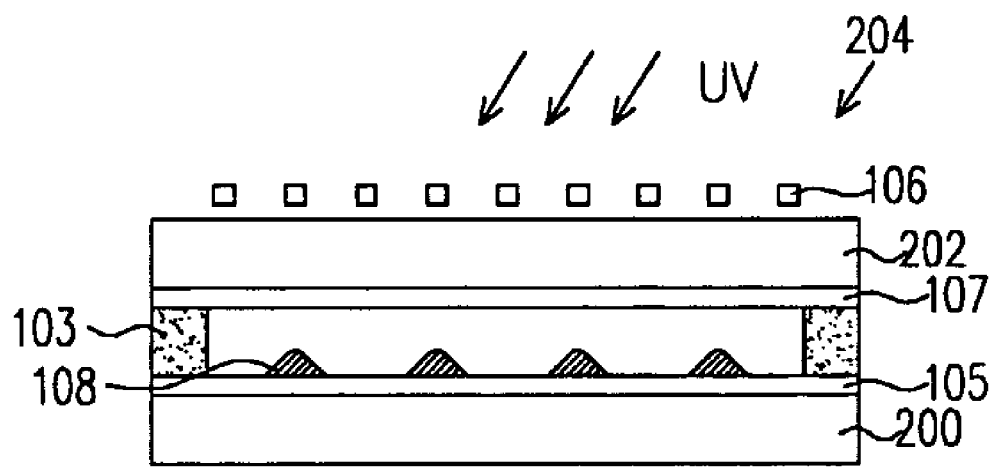
FIG. 2 is a schematic cross-sectional view of a touch control panel according to one preferred embodiment of this invention.
Figure 3:
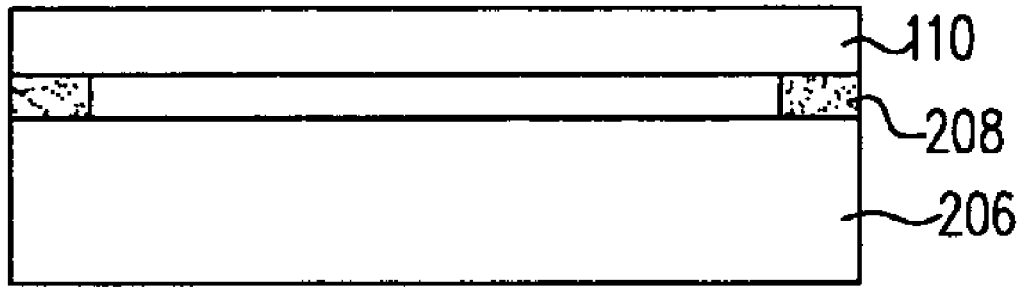
FIG. 3 is a schematic cross-sectional view of a conventional liquid crystal display panel with a touch panel structure therein.

FIG. 2 is a schematic cross-sectional view of an ultra-violet light resisting touch control panel 204 according to one preferred embodiment of this invention. The touch control panel 204 includes a transparent substrate 200 and a contact layer 202. The transparent substrate 200 or the contact layer 202 or both are capable of blocking out or absorbing ultra-violet rays. Material constituting the transparent substrate 200 and the contact layer 202 may be identical or different. The transparent substrate 200, for example, is an ultra-violet ray shielding glass panel. The contact layer 202 is fabricated using a material selected from a group including polyester, glass or glass with a transparent electrode. Furthermore, an optical coating such as a polarizing film may be deposited on the surface of the transparent substrate 200 or the contact layer 202.

The capacity to resist ultra-violet rays for the transparent substrate 200 or the contact layer 202 is obtained by adding some ultra-violet light absorbing material. Alternatively, a layer capable of shielding against ultra-violet rays is coated on one or both surfaces of the transparent substrate 200 or contact layer 202.

As ultra-violet rays pass through the transparent substrate 200, a portion of the ultra-violet light is absorbed, hence effectively lowering the strength of the rays. A first transparent electrode 105 is formed over the transparent substrate 200. Furthermore, a second transparent electrode 107 is formed on the side of the contact layer 202 facing the first transparent electrode 105. The first transparent electrode 105 and the second transparent electrode 107 can be fabricated using an identical material or a different material, for example, indium-tin-oxide. A plurality of spacers 108 is formed in the space between the first transparent electrode 105 of the substrate 200 and the second transparent electrode 107 of the contact layer 202. In general, the spacers 108 are formed on the substrate 200 by printing. An adhesive element 103 is also attached to the edges of the first transparent electrode 105.

Thereafter, the second transparent electrode 107 on the contact layer 202 is attached to the adhesion element 103. Hence, a space is formed between the transparent substrate 200 and the contact layer 202. The contact layer 202 also has a hard coating 106 on the surface opposite to the second transparent electrode for protecting the contact layer 202 and increasing its hardness. When the contact layer 202 is touched, the second transparent electrode 107 of the contact layer 202 will contact the first transparent electrode 105 of the substrate 200. An evaluation of contact resistance is able to find the exact position of the contact point.

In this invention, the transparent substrate 200 is fabricated using ultra-violet ray resistant materials such as ultra-violet light resistant glass. Hence, the transparent substrate 200 can protect devices underneath the touch control panel 204. In addition, if the contact layer 202 is fabricated with ultra-violet light resisting material, a better shielding of the underlying devices can be obtained.

Figure 4:
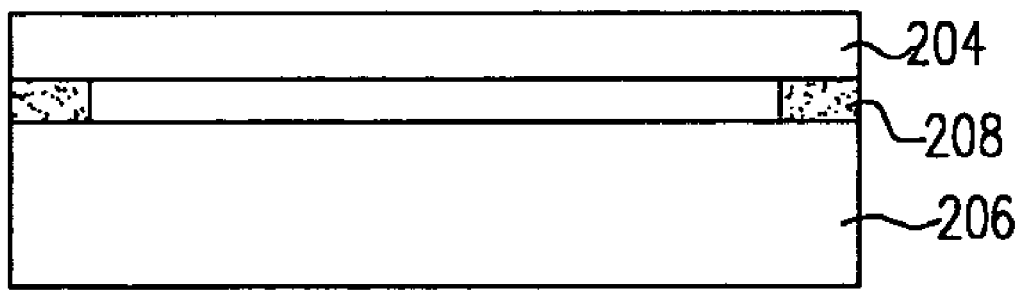
FIG. 4 is a schematic cross-sectional view of a liquid crystal display panel with a touch panel structure therein according to this invention.

The touch control panel 204 fabricated according to this invention is also shielded from ultra-violet light. The touch control panel 204 is positioned above a display panel 206 such as an organic light-emitting diode panel, a plasma display panel, a liquid crystal display panel or a cathode ray tube display screen. FIG. 4 is a schematic cross-sectional view of a liquid crystal display panel with a touch panel structure therein according to this invention. As shown in FIG. 4, the edges of the touch control panel 204 with ultra-violet light resisting capability are attached to the edges of a liquid crystal display panel 206 using double-sided tape 208. Consequently, internal elements such as a light-channeling panel underneath the liquid crystal display panel 206 are well protected.

Because the touch control panel 204 is capable of shielding or absorbing ultra-violet rays, strength of the ultra-violet rays after passing through the touch control panel 204 will be immensely weakened. Since the display panel 206 is no longer affected by incoming ultra-violet light, working life of the display panel 206 is extended. Here, the display panel 206 refers to an organic light-emitting diode (OLED) panel, a plasma display panel (PDP), a liquid crystal display (LCD) panel or a cathode ray tube (CRT) display monitor, for example.

With the same design concept in mind, the transparent substrate 200 or the contact layer 202 or both can have ultra-violet light shielding capacity for reducing the intensity of ultra-violet light illumination.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

The invention claimed is:

1. A display device structure, comprising:
a display panel, wherein the display panel is selected from the group consisting of an organic light-emitting diode panel, a plasma display panel, a liquid crystal display panel and a cathode ray tube screen display; and
a touch control panel over the display panel, the touch control panel comprising
a transparent substrate;
a first transparent electrode disposed on the transparent substrate;

a contact layer over the transparent substrate; and a second transparent electrode disposed on surface of the contact layer facing the first transparent electrode, wherein at least the transparent substrate and the contact layer are capable of resisting ultra-violet rays such that intensity of the ultra-violet rays after passing through the touch control panel is substantially reduced, and wherein material constituting the contact layer is selected from the group consisting of polymer resin, polyester, glass, and glass with a transparent electrode therein.

2. The display device structure of claim 1, wherein the contact layer further includes an ultra-violet ray resisting layer for shielding or absorbing ultra-violet rays.

3. The display device structure of claim 1, wherein the contact layer and the transparent substrate comprise an optical coating thereon.

4. The display device structure of claim 1, wherein the touch control panel further includes an adhesion element attached to the edges of the first transparent electrode.

5. The display device structure of claim 1, wherein the touch control panel further includes a hard coating on the outward facing surface of the contact layer.

6. The display device structure of claim 1, wherein the space between the first transparent electrode and the second transparent electrode comprise a plurality of spacers.

7. The display device structure of claim 1, wherein both the transparent substrate and the contact layer of the touch control panel have ultra-violet ray resisting capability.

8. The display device structure of claim 1, wherein the first transparent electrode and the second transparent electrode of the touch control panel is made from identical material or different materials.

9. The display device structure of claim 1, wherein the touch control panel is attached to the display panel through double-sided tape.

* * * * *